US006685145B2

(12) United States Patent
Mackay et al.

(10) Patent No.: US 6,685,145 B2
(45) Date of Patent: Feb. 3, 2004

(54) MUSICAL INSTRUMENT SUPPORTING STAND

(76) Inventors: Donald Mackay, 370 Iron Bridge Rd., Freehold, NJ (US) 07728; Jessie Cochran, 1301 El Larkwood, West Covina, CA (US) 91790

( * ) Notice: Subject to any disclaimer, the term of this patent is extended or adjusted under 35 U.S.C. 154(b) by 0 days.

(21) Appl. No.: 10/098,930

(22) Filed: Mar. 15, 2002

(65) Prior Publication Data

US 2003/0173473 A1 Sep. 18, 2003

(51) Int. Cl.[7] ........................... A47F 5/00; F16M 13/00
(52) U.S. Cl. .................. 248/125.1; 248/418; 248/125.8
(58) Field of Search ........................... 248/125.1, 125.8, 248/159, 160, 176.3, 406.1, 404, 409, 425, 414, 418, 622

(56) References Cited

U.S. PATENT DOCUMENTS

| | | | | | |
|---|---|---|---|---|---|
| 1,045,583 | A | * | 11/1912 | Mills | 211/165 |
| 2,106,650 | A | * | 1/1938 | Owler | 248/418 |
| 2,455,821 | A | | 2/1948 | Stenger | |
| 4,148,524 | A | * | 4/1979 | Guyton | 248/188.5 |
| 4,221,368 | A | * | 9/1980 | Channel | 269/227 |
| 4,278,222 | A | * | 7/1981 | Siegel | 248/121 |
| 4,352,480 | A | | 10/1982 | Gathright | |
| 4,381,690 | A | * | 5/1983 | Kimble | 248/171 |
| 4,510,838 | A | * | 4/1985 | Alexis, Jr. | 84/422.3 |
| 4,561,339 | A | * | 12/1985 | Jensen | 248/441.1 |
| 4,657,267 | A | * | 4/1987 | Jaumann et al. | 248/170 |
| 4,705,256 | A | * | 11/1987 | Hofrichter | 248/349.1 |
| 4,725,027 | A | * | 2/1988 | Bekanich | 248/125.8 |
| 5,022,617 | A | * | 6/1991 | Henderson | 248/125.8 |
| 5,149,901 | A | | 9/1992 | Boor | |
| 5,454,473 | A | | 10/1995 | Hennessey | |
| 5,497,965 | A | * | 3/1996 | Mathieu, Jr. | 248/159 |
| 6,127,612 | A | * | 10/2000 | Yu | 84/327 |
| 6,209,829 | B1 | * | 4/2001 | Yu | 248/122.1 |
| 6,252,150 | B1 | | 6/2001 | Johnson | |
| 6,316,706 | B1 | * | 11/2001 | Sammons | 84/327 |
| 6,323,405 | B1 | * | 11/2001 | Yu | 84/327 |
| 6,612,534 | B2 | * | 9/2003 | Hennessey | 248/519 |

OTHER PUBLICATIONS

Quik_Lok Detail for: revolving guitar stand.

* cited by examiner

*Primary Examiner*—Korie Chan
*Assistant Examiner*—Naschica S. Morrison
(74) *Attorney, Agent, or Firm*—Daniel S. Kirshner

(57) ABSTRACT

A stand for supporting one or more musical instruments that swivels to permit the selected musical instrument to be made available directly in front of the user or in another predetermined selected position and can be locked in position for ready access. The present invention comprises a swiveling support post and a fixed inner support post contained therein. The swiveling support post is selectively locked or unlocked in a desired position through employment of a locking swivel assembly. The locking swivel assembly includes a tension spring whose tension force is employed to exert braking pressure thereby locking the outer swivel post in a predetermined selected position. A foot pedal release mechanism is provided which releases the force on the tension spring thereby releasing the braking pressure and allowing free rotation of the outer swivel post. A folding tripod base portion provides support for the entire assembly and folds for ready storage. A plurality of upper and lower musical instrument supports are attached to the swiveling support post wherein said upper musical instrument supports are radially displaced to accommodate the maximum number of musical instruments.

5 Claims, 2 Drawing Sheets

MUSICAL INSTRUMENT SUPPORTING STAND

FIELD OF THE INVENTION

The present invention is a stand for supporting multiple musical instruments. More specifically, the musical instrument supporting stand of the present invention includes a locking foot pedal assembly that allows the operator to selectively lock and unlock a swiveling support post thereby facilitating ready access to a choice of musical instruments.

BACKGROUND OF THE INVENTION

Musical instrument stands are used by professional musicians, school bands, and amateur musicians. Many musicians, be they professional or amateur, have the need to have more than one musical instrument available to them if they are performing on stage or if they are recording in the studio. Those who have several musical instruments have a need to be able to safely store their instruments when they are not using them or to have them readily available when they want to play them. In many music venues and recording studios, there is limited space to hold multiple musical instruments. It is also difficult to lift musical instruments out of fixed holding racks when the instrument is not directly in front and there is potential for damaging the instrument. Moving around fixed musical instrument stands in many music venues or in recording studios can be difficult. In many situations, there is an important commercial and artistic need for easy access to multiple musical instruments.

There are, of course, many prior art musical instrument stands. The current musical instrument stands are designed to hold from one to six musical instruments. The most common stand holds one instrument and the next most common stand holds two instruments. Stands that hold more than three instruments are usually of a rack design and can hold up to six instruments. The most common of these instrument stands are used for guitars, however different stands are used for a variety of musical instruments. Musical instrument stands are typically constructed from steel, and can have upper and lower instrument supports and usually have tripod legs that fold for ease of transportation. The musical instrument supports can be covered with soft material so as not to damage the instrument.

Most prior art musical instrument stands are designed to hold the instruments in a fixed position. One such prior art musical instrument stand is disclosed in U.S. Pat. No. 5,454,473 entitled Multiple Musical Instrument Supporting Stand and was issued to Hennessey on Oct. 3, 1995. This patent discloses a stand for supporting one or more guitars and comprises an upright post having three yokes at its upper end and three radially extending legs assembled on a hub at its lower end. Each leg carries a holding member, vertically aligned under a yoke and serving to receive the bottom strap knob of the guitar. The central post consists of an outer tube and an inner tube contained telescopically within the outer tube. Significantly, the inner tube includes a groove formed along its length for engagement of a thumb screw. The disclosure of the invention recites that the combination of the thumb screw and groove serves to "prevent relative rotation of the components" (emphasis added.) As such, this patent discloses a multiple musical instrument stand wherein the instruments are held in a fixed position.

Another example of the prior art in musical instrument stands is disclosed in U.S. Pat. No. 4,352,480 issued to Gathright on Oct. 5, 1982. This patent discloses a double guitar stand which includes a collapsible frame that fits into a carrying case. As is evident, this guitar stand holds a plurality of guitars in a fixed relationship and fixed in position.

An example of a rack-type multiple guitar stand that retains the instruments in a fixed position is disclosed in U.S. Pat. No. 5,149,901 entitled Guitar Support Apparatus and issued to Boor et al. on Sep. 22, 1992.

Finally, one more prior art example is disclosed in U.S. Pat. No. 2,455,821 entitled Cradle for Bass Viola or Other Stringed Instruments issued to Stenger on Dec. 7, 1948. This patent discloses a support for violas or other musical instruments and is designed to hold multiple instruments in a fixed arrangement.

As can be seen, none of the prior art presents a musical instrument stand for supporting a plurality of instruments that swivels to permit ready access to the instrument of choice and also includes a locking mechanism to selectively lock and unlock the chosen instrument in its predetermined selected position.

Therefore, it is an objective of the present invention to provide a musical instrument stand that has the dual ability to hold multiple musical instruments in a fixed position and to also allow the instruments to swivel or rotate to a predetermined selected position.

It is a further objective of the present invention to provide a non-rack type musical instrument stand that holds more than three musical instruments.

It is a further objective of the present invention to provide for the maximum storage of instruments in a limited space situation and to provide the best possible access to the instruments.

It is a further objective of the present invention to provide a musical instrument stand that would be commercially competitive and provide for ease of transportation and storage.

Other objectives, advantages and novel features, and further scope of applicability of the present invention will be set forth in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a stand for supporting one or more musical instruments. The multiple musical instrument stand of the present invention swivels to permit the selected musical instrument to be made available directly in front of the user or in another predetermined selected position. Furthermore, through employment of a foot pedal, the selected instrument can be locked in position for ready access. The present invention comprises a swiveling support post and a fixed inner support post contained therein. The swiveling support post is selectively locked or unlocked in a desired position through employment of a locking swivel assembly. The locking swivel assembly includes a tension spring whose tension force is employed to exert braking pressure thereby locking the outer swivel post in a predetermined selected position. A foot pedal release mechanism is provided which releases the force on the tension spring thereby releasing the braking pressure and allowing free rotation of the outer swivel post. A folding tripod base portion provides support for the entire assembly and folds for ready storage. A plurality of upper and lower musical instrument supports are attached to the swiveling support post wherein said upper musical instrument supports are radially displaced to accommodate the maximum number of musical instruments. The upper and lower instrument supports fold to insure ease of transportation and storage.

BRIEF DESCRIPTION OF THE DRAWINGS

For a better understanding of the present invention, reference is made to the following description of an exemplary embodiment thereof, considered in conjunction with the accompanying drawings, in which:

FIG. 3 is a detail view of the hinged upper and lower instrument support stands.

DETAILED DESCRIPTION OF THE INVENTION

The present invention is a musical instrument stand that allows musicians, stage hands, or other users ready access to a selection of multiple musical instruments. Although the present embodiment is described in relation to retaining multiple guitars, it should be apparent from the disclosure that this invention could be utilized with other stringed instruments as well as a variety of other musical and non-musical instruments. The present invention musical instrument stand includes a swiveling support post to permit the selected musical instrument to be made available directly in front of the user. Furthermore, through employment of a locking swivel assembly that includes a foot pedal activator, the selected instrument can be locked into position for ready access.

Figure 1:
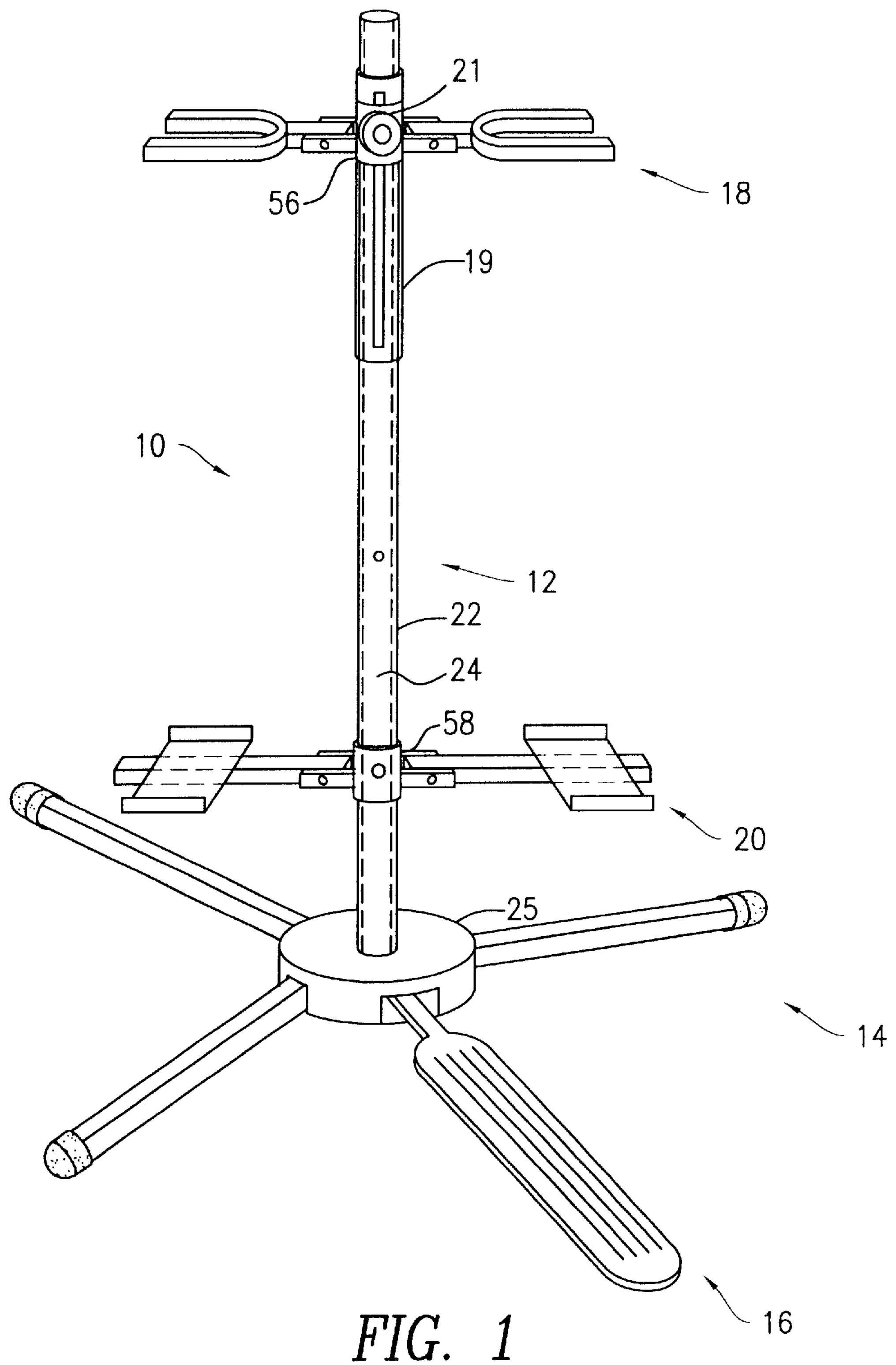
FIG. 1 is an orthographic view of the musical instrument stand of the present invention showing the support post in cross-sectional view.

Referring first to FIG. 1, the present invention musical instrument stand 10 is depicted. The musical instrument stand comprises a swiveling support post 12, a tripod base portion 14, and a foot pedal swivel release assembly 16. Attached to the swiveling support post 12 is at least one upper instrument support 18 and at least one lower instrument support 20. As depicted, the musical instrument stand is formed from steel construction, although construction from other rigid materials such as molded plastic are within the scope of this disclosure.

The swiveling support post includes an outer swivel post 22 and a fixed inner support post 24 depicted in broken lines contained within the outer swivel post. The outer swivel post is generally cylindrical and hollow and has a predetermined height chosen to be appropriate for the type of musical instrument to be retained. The upper instrument support 18 is attached to an adjustable height assembly 19. The adjustable height support assembly is rigidly attached to the swiveling support post 12 and has a vertical groove/locking knob assembly 21 to allow the upper instrument support to be vertically adjustable. The fixed inner support post is also generally cylindrical having a diameter slightly smaller than the interior diameter of the outer swivel post so that the outer support post can rotate freely, yet not wobble while rotating. Preferably, the height of the fixed inner support post is slightly less than the outer swivel post. As will be seen, the outer swivel post extends downward to the swivel assembly which is hidden by its cover 25 and the inner fixed support post extends further downward to a stand support plate. The cover 25 is included to protect and hide the swivel assembly that is contained therein.

Figure 2:
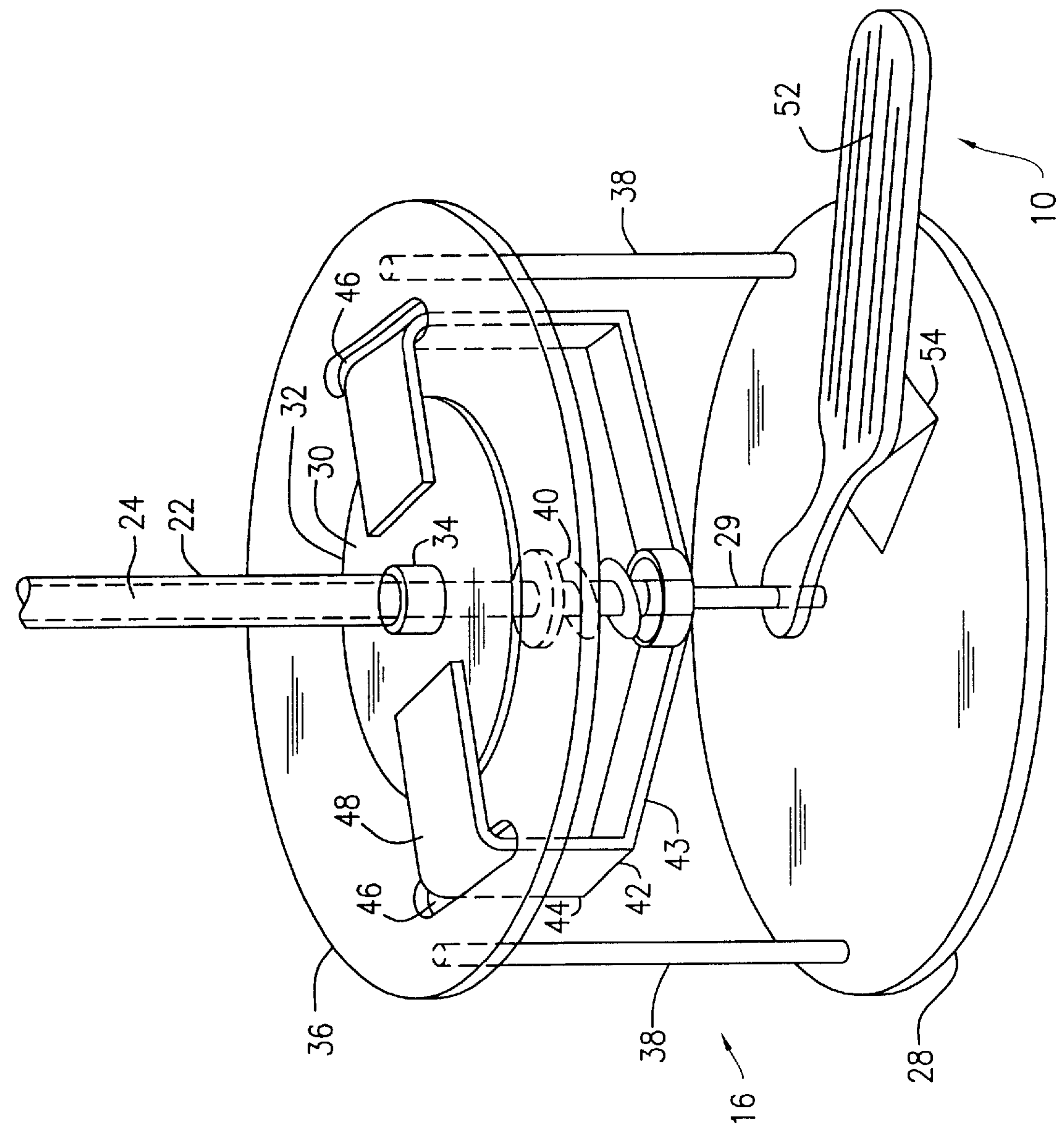
FIG. 2 is a detailed view of the swivel assembly of the musical instrument stand of the present invention.

Attention is now turned to FIG. 2 which depicts the swivel assembly 26 of the present invention in greater detail and with its cover removed. As can be seen in FIG. 2, a stand support plate 28 is provided of a size and weight sufficient to support the present invention musical instrument stand and the instruments retained thereby. The fixed inner support post 24 is rigidly attached to attachment plate 36 which is connected by a plurality of support rods 38 to the stand support plate 28. The fixed inner support post extends upwards in a direction whereby its longitudinal axis is substantially perpendicular to the plane of the stand support plate.

The outer swivel post 22 is attached to swivel assembly by a swivel post support plate assembly 30 and extends vertically upward. The swivel post support plate assembly includes an annular doughnut-shaped horizontal member 32 connected to a cylindrical vertical member 34 extending upward therefrom. The vertical member has a diameter slightly larger than the external diameter of the swivel post 22 and is spot welded or otherwise attached thereto. It will be appreciated that the swivel post support assembly 30 is rigidly connected to the outer swivel post and as such rotates in coordination with the outer swivel post. A ball bearing assembly can be installed under the swivel post support assembly 30 to assist rotation as required, depending upon the weight of the supported musical or non-musical instruments.

An attachment plate 36 is provided which is an annular member and its doughnut hole surrounds the swivel post 22 but is not attached thereto. The plane of the attachment plate is substantially parallel to the plane of the stand support plate 28 and is separated spatially by a plurality of fixed separation rods 38. Extending downward from the attachment plate is a locking plate tension spring 40 which connects the attachment plate to a swivel locking plate assembly 42. The swivel locking plate assembly is a bracket having a first horizontal aspect 43, a vertical aspect 44 of the bracket which extends through the attachment plate at attachment plate apertures 46 and a second horizontal aspect 48 of the swivel plate assembly curves which back over the swivel post support plate assembly 30.

In its normal operating position, the tension spring is uncompressed. As such, it will be appreciated that the tension of the spring exerts a downward force on the swivel locking plate assembly 42. Thus, the horizontal aspect 48 of the swivel locking plate assembly abuts against the swivel post support plate assembly 30. As such, a braking force is exerted against the swivel post support plate assembly thereby locking the swivel post in its predetermined chosen position.

The foot pedal assembly 16 is attached to the vertical connector rod 29 that connects the foot pedal 52 to swivel locking plate assembly 42. The foot pedal assembly operates as a level with a fulcrum 54. Thus, when a user exerts downward vertical force by foot pressure on the foot pedal, the vertical connector rod is forced upward thereby compressing the tension spring. In coordination, the swivel locking plate assembly 42 is also forced upward thereby separating the swivel locking plate assembly from the swivel post support plate assembly 30. As such, the braking action is released and the swivel post now rotates freely. Therefore, the user can selected the desired position for the chosen musical instrument.

Referring back to FIG. 1, attached to the stand support plate are typical tripod stand support legs 14. In the present embodiment of this musical instrument stand, the three legs of the tripod stand fold thereby facilitating storage and transport.

Still looking at FIG. 1, at least one upper instrument support 18 is attached to the swivel post 22. As depicted in FIG. 1, the upper instrument support is configured to retain a guitar, but could easily be adapted to retain most other hand-held musical instruments, tools or other devices. As shown, the upper instrument support for the guitar includes a U-shaped element that cradles the neck of the guitar, just below its tuning pegs. The U-shaped element is configured radially and therefore the guitar is retained radially. In other words, the plane of the faces of the two prongs of the upper instrument support is substantially parallel to the soundboard of a guitar being retained therein. The advantage presented by the radial arrangement of the upper instrument support is that the musical instrument stand of the present invention can hold a large number of instruments. Specifically, the musical instrument stand can retain up to eight guitars simultaneously. The upper instrument support is hingedly attached to the adjustable height assembly 19 at point 56 thereby permitting the upper support stand to be folded for ease of transportation and storage.

At least one lower musical instrument support 20 is provided and is hingedly attached to the outer swivel post at point 58. Of course, the number of lower musical supports should be equal to the number of upper musical instrument supports. The lower musical instrument support is a rigid extension and should be parallel to the floor. Soft cushioning is provided for both the upper and lower instrument support in order to prevent scratching or other damage to the surface of the instruments. The arrangement of the upper and lower instrument supports would provide for the maximum storage of instruments in a limited storage space situation and would hold the instruments securely so that the instruments would not come into contact with each other as the stand rotates.

What is claimed:

1. A musical instrument stand for retaining at least one musical instrument, comprising:

a. an outer swivel support post;

b. an inner fixed musical instrument support post contained within said outer swivel support post wherein said outer swivel support post rotates relative to said inner fixed support post;

c. a locking swivel assembly for selectively locking and unlocking said outer swivel support post, said locking assembly including a tensioning means for exerting braking force to stop rotation of said outer swivel support post relative to said inner support post and further including a foot pedal activated mechanism for releasing tension on said tensioning means through downward pressure on said foot pedal thereby selectively releasing the braking force and allowing rotation of said outer swivel support post, d. at least one upper instrument support attached to said outer swivel support post, and e. at least one lower musical instrument support stand attached to said outer swivel support post.

2. The musical instrument stand of claim 1 including at least four radially configured upper instrument supports attached to said outer swivel support post for retaining at least four musical instrument.

3. The musical instrument stand of claim 1 wherein said at least one upper instrument support is hindgedly attached to said outer swivel stand.

4. The musical instrument stand of claim 1 wherein said tensioning means is a spring.

5. The musical instrument stand of claim 1 wherein said at least one upper instrument support attached to said outer swivel support post is radially configured.

* * * * *